(12) United States Patent
Bjerregaard

(10) Patent No.: US 8,112,654 B2
(45) Date of Patent: Feb. 7, 2012

(54) METHOD AND AN APPARATUS FOR PROVIDING TIMING SIGNALS TO A NUMBER OF CIRCUITS, AND INTEGRATED CIRCUIT AND A NODE

(75) Inventor: Tobias Bjerregaard, Bagsværd (DK)

(73) Assignee: Teklatech A/S, Lyngby (DK)

( * ) Notice: Subject to any disclaimer, the term of this patent is extended or adjusted under 35 U.S.C. 154(b) by 875 days.

(21) Appl. No.: 11/921,309

(22) PCT Filed: May 26, 2006

(86) PCT No.: PCT/DK2006/000290
§ 371 (c)(1),
(2), (4) Date: May 28, 2008

(87) PCT Pub. No.: WO2006/128456
PCT Pub. Date: Dec. 7, 2006

(65) Prior Publication Data
US 2008/0276116 A1 Nov. 6, 2008

Related U.S. Application Data

(60) Provisional application No. 60/685,882, filed on Jun. 1, 2005.

(51) Int. Cl.
*G06F 1/10* (2006.01)
(52) U.S. Cl. ......... 713/500; 713/600; 375/355; 375/356
(58) Field of Classification Search .......... 713/500, 713/600; 375/355, 356
See application file for complete search history.

(56) References Cited

U.S. PATENT DOCUMENTS

| | | | |
|---|---|---|---|
| 4,290,108 A | 9/1981 | Woehrle et al. | |
| 4,514,840 A | 4/1985 | Bader et al. | |
| 4,695,839 A * | 9/1987 | Barbu et al. | 340/3.21 |
| 4,980,851 A | 12/1990 | Komori et al. | |
| 5,163,068 A * | 11/1992 | El-Amawy | 375/356 |
| 5,264,738 A | 11/1993 | Veendrick et al. | |
| 5,305,277 A | 4/1994 | Derwin et al. | |
| 5,463,337 A * | 10/1995 | Leonowich | 327/158 |
| 5,521,499 A * | 5/1996 | Goldenberg et al. | 327/237 |
| 5,701,296 A | 12/1997 | Yamauchi | |
| 5,723,989 A | 3/1998 | Steinlechner | |
| 5,808,486 A | 9/1998 | Smiley | |
| 5,935,256 A * | 8/1999 | Lesmeister | 713/400 |

(Continued)

OTHER PUBLICATIONS

Tobias Bjerregaard et al., "A Scalable, Timing-Safe, Network-on-Chip Architecture with an Integrated Clock Distribution Method", *Design Automation and Test in Europe Conference*, Nice, France, Apr. 16-20, 2007.

(Continued)

*Primary Examiner* — Kim Huynh
*Assistant Examiner* — Zahid Choudhury
(74) *Attorney, Agent, or Firm* — Harness, Dickey & Pierce, P.L.C.

(57) ABSTRACT

A method of providing or transporting a timing signal between a number of circuits, electrical or optical, where each circuit is fed by a node. The nodes forward timing signals between each other, and at least one node is adapted to not transmit a timing signal before having received a timing signal from at least two nodes. In this manner, the direction of the timing skew between nodes and circuits is known and data transport between the circuits made easier.

46 Claims, 2 Drawing Sheets

U.S. PATENT DOCUMENTS

| | | | |
|---|---|---|---|
| 6,229,360 B1 | 5/2001 | Mizuno et al. | |
| 6,346,828 B1 | 2/2002 | Rosen et al. | |
| 6,594,772 B1 * | 7/2003 | Tsai et al. | 713/500 |
| 6,747,997 B1 | 6/2004 | Susnow et al. | |
| 7,444,385 B2 * | 10/2008 | Blumrich et al. | 709/217 |
| 2002/0049936 A1 | 4/2002 | Gutnik et al. | |
| 2003/0197537 A1 | 10/2003 | Saint-Laurent | |
| 2003/0201814 A1 | 10/2003 | Braunisch et al. | |
| 2004/0114609 A1 | 6/2004 | Swarbrick et al. | |
| 2004/0151209 A1 | 8/2004 | Cummings et al. | |
| 2005/0024110 A1 | 2/2005 | Klass | |
| 2007/0047375 A1 | 3/2007 | Minzoni | |
| 2008/0180151 A1 | 7/2008 | Gong et al. | |
| 2008/0276116 A1 | 11/2008 | Bjerregaard | |

OTHER PUBLICATIONS

U.S. Office Action mailed Oct. 2, 2009 in U.S. Appl. No. 11/905,422.

Notice of Allowance dated Mar. 31, 2011 issued in co-pending U.S. Appl. No. 11/905,422.

Office Action dated Nov. 7, 2010 issued in co-pending U.S. Appl. No. 11/905,422.

El-Amawy, "Clocking Arbitrarily Large Computing Structures Under Constant Skew Bound", IEEE Transactions on Parallel and Distributed Systems, vol. 4, No. 3, Mar. 1993, pp. 241-255.

\* cited by examiner

Non-inverting

Inverting

METHOD AND AN APPARATUS FOR PROVIDING TIMING SIGNALS TO A NUMBER OF CIRCUITS, AND INTEGRATED CIRCUIT AND A NODE

CROSS-REFERENCE TO RELATED APPLICATIONS

This is a National Stage of PCT Patent Application No. PCT/DK2006/000290, filed May 26, 2006, which claims the priority under 35 U.S.C. §119 to U.S. Application No. 60/685,882, filed Jun. 1, 2005.

FIELD OF INVENTION

The present invention relates to the clocking of e.g. large synchronous systems in a mesochronous fashion, wherein a master clock is distributed across the system so that the clocking signal at any point in the system has the same frequency as—or a dividable of—the master clock frequency, but with different phase at different locations in the system.

The invention is particularly suitable for clocking of applications or circuits on a single chip.

It also relates to the establishment of a global communication network, and the timing safe clocking of such a network, with regards to data transfer across the borders of clock phase regions. Without being limited to such a network, the invention can be used to enable timing safe data transfer across the borders of clock phase regions in general.

BACKGROUND

Strict global synchrony is becoming prohibitively difficult to implement in large chips. Increasingly complex clock distribution techniques used to minimize clock skew, e.g. involving distributed active skew control, are taking an increasing portion of the total power consumption, more than 30% in high-end microprocessors. Clock distribution using standing waves has also been proposed. These facilitate high-speed clocks with very low skew. However, the clock frequency is dependent on parameters of on-chip components, as it is implemented as standing waves in a grid structure. Alternatively a larger skew is accepted, at the cost of performance, since the timing margin incurred constitutes an increasing percentage of the total cycle time. Ultimately, failure to live up to the challenges of implementing a globally spanning synchronous clock signal may render an entire chip non-functional due to hold time violations.

Meanwhile, physical issues as well as design complexity issues push for a modularized design approach. There is a general consensus that the design tasks of future billion transistor system-on-chip designs are best accommodated by plugging together individually verified blocks, using shared, segmented chip-area interconnection networks. Recent years have seen research into the area of so called Network-on-Chip (NoC). NoC facilitates a truly modular and scalable design approach for Systems-on Chips (SoC).

The partitioning of chip functionality into submodules, or cores, enables a timing-wise partitioning as well. The globally asynchronous locally synchronous (GALS) approach implements synchronous islands which communicate asynchronously. Drawbacks of the GALS approach include the risk of data and control metastability in crossing the boundary between the asynchronous and synchronous domain as well as the overhead of implementing circuits to provide timing-safe cross domain transmission.

Alternatively, mesochronous clocking may be applied. Mesochronously clocked systems employ a single clock across the entire system, but with different phases. In a generalized form, nothing can be said concerning the phase alignment between cores in different clock-phase domains. Thus metastability may occur when passing data from one domain to another. Mesochronously clocked systems benefit from leveraging existing synchronous design tools and know-how, while avoiding the drawbacks of strict global synchrony: a peak current at the global clock edge, which leads to ground bounce and voltage drops, which in turn induce jitter in both clock and data, is avoided; also power dissipation in the clock distribution network is significantly reduced since power hungry clock trees to reduce global clock skew are avoided.

Methods for avoiding metastability have been proposed in various forms. Also, work has aimed at containing the clock skew in mesochronous systems, such as in El-Amawy, "Clocking arbitrarily large computing structures under constant skew bound", IEEE Transactions on Parallel and Distributed Systems 4, 1993, pp 241-255. In this reference, a network of interacting clock generating nodes is presented. The method guarantees an upper bound on local skew. However, the node interaction involves loops and the sign—positive or negative—of the skew is not guaranteed, only the absolute value. Thus in a practical system, hold-time violations are still possible. Also, the practical implementation of the nodes is somewhat complex, introducing a non-negligible overhead.

SUMMARY

In a first aspect, the invention relates to a method of providing timing signals to a number of circuits, the method comprising:
  providing a plurality of interconnected nodes, each circuit being connected to a node, each node receiving a timing signal from one or more other nodes and transmitting a corresponding timing signal to at least one other node and/or a circuit(s) connected to the node,
  providing a timing signal to one of the nodes,
  at least one node receiving a timing signal from each of two or more nodes and not transmitting the corresponding timing signal to the at least one other node and/or a circuit(s) connected thereto, before a timing signal has been received from each of the two or more nodes.

In the present context, a circuit may be an electrical circuit or an optical circuit. Electrical or optical circuits may be very small circuits the size of (or actually be) a flip flop or a latch or large circuits as whole computers, processors, storage circuits, parts of such circuits, such as drivers, I/O-units, processing units or the like.

Naturally, the timing relationship between circuits is as relevant between physically separated or free-standing circuits, such as in parallel computers or networks, as between circuits that are positioned e.g. on the same integrated circuit.

The present transfer of timing signals, naturally, may be any type of signal transmission, such as via electrical cables, optical cables, by wireless transmission (optical, microwave, radio, audio, or the like).

Thus, the circuits may also be interconnected in other manners than via the present nodes, such as by a power grid or data cables or electrical conductors over which data is communicated.

Normally, the circuits are digital circuits, but timing of analogue circuits may also be of interest. The timing of digital circuits may be used for either clocking internal processes of the circuits and/or a clocking used for communicating data between the circuits.

In the present context, a timing signal may be any type of signal having a variation over time which may be determined by a circuit. One type of electrical signal is a square wave signal or a sine wave signal. However, any type of signal may be used. Also, it is not at all required that the timing signals transmitted by the individual nodes are identical or of the same type. This is explained in larger detail below.

A node will receive a timing signal and output a corresponding timing signal. In this context, the "correspondence" is a timing correspondence meaning that the node will output the timing signal after having received a timing signal. If two timing signals are received before outputting the first timing signal, two timing signals will, normally, be output, the first timing signal corresponding to the first timing signal received and the second timing signal output corresponding to the second timing signal received.

According to the invention, the at least one node will not output the corresponding timing signal before having received a timing signal from each of the (more than one) nodes adapted to transmit timing signals to the node.

In one situation, the timing signal is only output to a circuit connected to the node, which means that the timing or clocking skew between that circuit and circuits connected to nodes, the timing signals output of which reach the present node (maybe via other nodes) is known. It has been ensured that the other circuits receive the timing signal before this circuit.

When the timing signal output is also or optionally transmitted to other nodes, this has the advantage that the delay in timing signals between the circuits is well behaved. Also, this gives a well-known direction of the skew, so that timing safe data transfer between the circuits is facilitated.

Preferably, a plurality of the nodes receive a timing signal from two or more nodes and do not transmit the corresponding timing signal to the at least one other node, before a timing signal has been received from each of the two or more nodes (connected to transmit timing signals to the node). As will be described in relation to the drawing, this actually provides a known timing skew through the whole topology of the network of nodes.

A more robust clocking scheme is obtained when one or more of the nodes, when receiving a first timing signal from one or more other nodes, transmit(s) an acknowledging signal to each of the one or more other node(s) (transmitting timing signals to the node). Transmitting the acknowledging signal back to the nodes transmitting the timing signals received first of all ensures that signals are not lost in the timing circuit. Also, and especially when the one or more nodes further do not transmit a subsequent timing signal received from the other node(s), before having received an acknowledging signal from each of the node(s) to which a timing signal corresponding to the first timing signal has been transmitted, timing signals are not able to reach each other in the system (a latter timing signal is not able to catch up with an earlier one), whereby it is even better ensured that timing signals are not lost.

In one embodiment, a node transmits, without delay, an acknowledging signal to the transmitting node. Alternatively, the one or more nodes may not transmit the acknowledging signal(s) before having received timing signals from all nodes transmitting timing signals to the node.

As indicated above, different timing signal types may be used. When the signals are used for transmitting data between circuits, such circuits normally would transmit data on a forward or a back edge of a digital timing signal being a signal varying, over time, between two or more predetermined levels (such as voltage levels).

When the clocking of the two circuits shifts slightly, a problem may occur in that the direction of the skew of the shift may not be known. Thus, transmitting and receiving on the same forward or back edge of the timing signal may cause problems.

This problem may be solved by having one of the circuits transmit/receive on the other of the two edges, but this would require each pair of transmitting/receiving circuit to be set up individually.

A solution to that problem is to invert the clocking signal for one of the circuits and have the transmitting circuit transmit data on one of the forward and back edges, and the receiving circuit receive at the other of the front or back edges. This means that both circuits either transmit/receive on the rising or falling edge. This may then be used in all receiver/transmitter pairs.

In the present context, inversion of the signal will may be seen as a mirroring of the time varying signal in a mean value of the value of this signal. Normally, the actual variation over time (that is, when an increase or fall of the value occurs) is not changed significantly—merely the value at one or more points in time.

Thus, at least one of the nodes may receive a timing signal being a sequence, in time, of at least two different values, and transmit, to the other node(s), as the corresponding timing signal, the received timing signal inversed so that high and low values are interchanged in the same timing sequence.

In a preferred embodiment, the method further comprises the step of two of the circuits interchanging data, the interchanging of data being controlled by the timing signals received by the circuits from each of two of the nodes (a circuit normally being timed by a single node and two circuits normally being timed by two different nodes).

In that situation, the method of interchanging data preferably comprises each of those circuits transmitting or receiving data in connection with a value change, in the timing signal received. This facilitates the production of the circuits. Then, this controlling could be based on a change from a lower of the two or more values to a higher of the values (such as the normal two states of digital communication) or a change from the higher to the lower of the values.

Then, the phase of the clock could be inverted between the two communicating circuits. This may be ensured where the two circuits are connected to two neighbouring nodes (where the node feeding the other node is inverting) or an even number of inverting nodes (and any number of non-inverting nodes) exist in the timing signal "chain" between the nodes feeding the two circuits with timing signals. Then, each circuit may transmit/receive on the same change (low to high or high to low).

An additional advantage is seen in the flow of timing signals through the nodes and thereby the circuits. The circuits may be topologically (geographically or mathematically) connected or provided in a number of dimensions, such as two, three or more dimensions. Such topology may be seen in e.g. parallel computers. This topology may be realized by the present network of nodes by positioning the nodes, physically/geographically or mathematically (by interconnecting the nodes to provide the correct topology) over a predetermined real or imaginary area defined by at least two non-parallel directions, the method comprising positioning the node(s) adapted to receive a timing signal from a transmitting node further in at least one of the directions than the transmitting node. In this manner, the timing skew will be along the directions and the propagation of the timing signals well behaved.

An easily understandable topology is one wherein the nodes are provided at least substantially in positions of a grid, that is, in positions corresponding to an intersection of one line of a plurality of at least substantially equidistantly positioned lines along a first direction and one line of a plurality of at least substantially equidistantly positioned lines along a second direction being non-parallel to the first direction. In that situation, the timing signals will flow from one "corner" of this structure to the opposite one. Also, link delays will be at least substantially the same, whereby the timing skew is more easily determined and controlled.

Another aspect of the invention relates to a method of preparing an integrated circuit, the method comprising,
1) providing a number of circuits on a surface,
2) providing a clock generating or receiving node,
3) providing a number of relay nodes, each circuit being connected to a node, each relay node receiving a signal from one or more nodes and transmitting a signal to at least one other relay node and/or a circuit connected thereto,
4) interconnecting the nodes so that a signal from the receiving/generating node causes a signal transmitted to all relay nodes and all circuits,
wherein:
step 3) comprises providing at least one of the relay nodes as a node adapted to receive a signal from at least two relay nodes and to not forward a signal to any other relay nodes and/or a circuit connected thereto, until a signal has been received from each of the at least two relay nodes, and
step 4) comprises interconnecting the at least one relay node so as to receive signals from the at least two relay nodes.

As is usual in chip manufacturing, the circuits are provided on a wafer or other surface. The nodes, or some of the nodes, may be prepared as a part of a circuit to which it is to be interconnected, or the nodes may be provided separately, such as separate IP which is provided by a subcontractor.

The clock generating or clock receiving node is that node of the nodes which firstly outputs a timing signal and from which all other nodes will receive timing signals, normally via other of the nodes. The generating/receiving node may generate the timing signal itself or it may be identical to the other nodes and receive a timing signal, such as from a clocking circuit.

Again, the at least one node will not transmit the output signal, until a signal has been received from all nodes interconnected to the node and adapted to transmit signals to the node.

Preferably, as is indicated above, step 3) comprises providing a plurality of the nodes adapted to receive a timing signal from two or more nodes and to not transmit the corresponding timing signal to the at least one other node, before a timing signal has been received from each of the two or more nodes.

Also, step 3) preferably comprises providing one or more of the nodes which, when receiving a first timing signal from one or more other nodes, transmit(s) an acknowledging signal to each of the one or more other node(s). Then, the one or more nodes may further not transmit a subsequent timing signal received from the other node(s), before having received an acknowledging signal from each of the node(s) to which a timing signal corresponding to the first timing signal has been transmitted. Additionally or alternatively, step 3) may comprise providing the one or more nodes adapted to not transmit the acknowledging signal(s) before having received timing signals from all nodes transmitting timing signals to the node.

The data transport is desired between circuits and may be made easier when step 3) comprises providing at least one of the nodes adapted to receive a timing signal being a sequence, in time, of at least two different values, and transmits, to the other node(s), as the corresponding timing signal, the received timing signal inversed so that high and low values are interchanged in the same timing sequence.

As indicated above, in a preferred embodiment, the method further comprises providing two (or more) of the circuits with means for interchanging data, the interchanging means being controllable by the timing signals received by the circuits from each of two of the nodes. Normally, this transmission of data will be controlled by the timing signals by the transmitting circuit transmitting a portion of the data when having received a timing signal from a node, and the receiving circuit receiving the portion of the data when having received a timing signal from a node, the two nodes normally being different (causing the prior art problem of holding and setup time violations). The portion of the data may be as little as a single bit, in digital communication, or a "wider bus" may be used, whereby more data may be transferred at a time.

Then, the interchanging means each may be adapted to transmit or receive data in connection with a change, in the timing signal received, from a lower of the two or more values to a higher of the values or a change from the higher to the lower of the values. In this manner, the changing of the timing signal controls the transmission/receipt of the data.

In one embodiment, the two circuits are adapted to transmit or receive data in connection with the same change (lower to higher or higher to lower) and are connected to two neighbouring of these inverting nodes or two nodes between which an even number of the at least one node(s) exist. When zero or an even number of inverting nodes exist between the nodes (of which the node feeding the other of the two nodes is inverting), the timing signals of the two nodes feeding each of the receiving/transmitting circuits will be inverted.

Also, the topology may be controlled when step 3) further comprises positioning the nodes geographically or mathematically over the predetermined area, defined by two non-parallel directions, so that the node(s) adapted to receive a timing signal from a transmitting node are positioned further in at least one of the directions than the transmitting node.

Due to the fact that the timing signals may cause noise to enter the circuits, if the interconnections between the nodes were to run over or close to the circuits, step 1) preferably comprises providing the circuits on the surface, so that at least a predetermined distance exists between neighbouring circuits, and wherein step 4) comprises interconnecting the nodes with electrical connections primarily positioned between the circuits, when projected onto a plane of the circuit.

A simplified topology is one wherein step 3) comprises positioning the nodes at least substantially in positions corresponding to an intersection of one line of a plurality of at least substantially equidistantly positioned lines along a first direction and one line of a plurality of at least substantially equidistantly positioned lines along a second direction being non-parallel to the first direction.

A third aspect of the invention relates to an apparatus for providing timing signals to a number of circuits, the apparatus comprising:
a plurality of interconnected nodes, each circuit being connected to a node, each node being adapted to receive a timing signal from one or more other nodes and to transmit a corresponding timing signal to at least one other node and/or a circuit(s) connected to the node, a circuit for providing a timing signal to one of the nodes, at least one node being adapted to receive a timing signal from each of two or more nodes and to not transmit the corresponding timing signal to the at least one other node and/or a circuit(s) connected thereto, before a timing signal has been received from each of the two or more nodes.

As mentioned above, both the circuits and the nodes may be integrated or separate parts or have any structure in between. Thus, each node and/or circuit may be separate circuits, such as network components, computers, processors, memories, or the like. Some of the nodes/circuits may be combined, so that e.g. a node and a circuit receiving the timing signals from the node may be combined either in one element or in a single integrated circuit. Ultimately, all circuits and nodes may form part of the same integrated circuit.

Naturally, the nodes may themselves be circuits or an assembly of circuits. Also, a node or a circuit adapted to perform a task, such as receive, transmit, or alter a signal, normally would comprise a processing means, such as a processor (hardwired or software programmable or anything in between), a FPGA, or the like. Also, it may comprise a memory (RAM, ROM, hard disc, floppy disc, optical disc, PROM, EPROM, EEPROM, or the like) as well as means for communicating the signal (any type of communication busses, ports, serial or parallel communication, electrical communication, optical communication, wireless communication, radio communication) in order to fulfil this task. A node or a circuit may be a comprehensive element comprising a large number of element, or it may be as small as a single gate, such as a flip flop or a latch.

As mentioned above, the corresponding timing signal, in this connection, is preferably a signal triggered by the receipt of a timing signal (or one timing signal from each of the inputs).

Preferably each of a plurality of the nodes is adapted to receive a timing signal from two or more nodes and to not transmit the corresponding timing signal to the at least one other node or the circuit, before a timing signal has been received from each of the two or more nodes. In this manner, the timing skew of the system will be well behaved.

In a preferred embodiment, one or more of the nodes are adapted to, when receiving a first timing signal from one or more other nodes, transmit an acknowledging signal to each of the one or more other node(s). Then, the one or more nodes may further be adapted to not transmit a subsequent timing signal received from the other node(s), before having received an acknowledging signal from each of the node(s) to which a timing signal corresponding to the first timing signal has been transmitted.

Additionally or alternatively, the one or more nodes may be adapted to not transmit the acknowledging signal(s) before having received timing signals from all nodes transmitting timing signals to the node.

As is indicated above, it may be preferred that at least one of the nodes is adapted to receive a timing signal being a sequence, in time, of at least two different values, and to transmit, to the other node(s), as the corresponding timing signal, the received timing signal inversed so that higher and lower values are interchanged in the same timing sequence.

Preferably, two of the circuits comprise means for interchanging data, the interchanging means being controllable by the timing signals received by the circuits from of the nodes.

Then, the interchanging means are preferably adapted to each transmit or receive data in connection with a change, in the timing signal received, from a lower of the two or more values to a higher of the values or a change from the higher to the lower of the values.

In one embodiment, the two circuits are adapted to transmit or receive data in connection with the same change (lower to higher or higher to lower) and are connected to two neighbouring nodes or two nodes between which an even number of the at least one node(s) exist.

Also, the topology of the system may be controlled by the interconnection of the nodes which may be positioned, geographically or mathematically, over a predetermined area defined by at least two non-parallel directions, the node(s) adapted to receive a timing signal from a transmitting node being positioned further in at least one of the directions than the transmitting node.

A simple topology is one wherein the nodes are provided at least substantially in positions corresponding to an intersection of one line of a plurality of at least substantially equidistantly positioned lines along a first direction and one line of a plurality of at least substantially equidistantly positioned lines along a second direction being non-parallel to the first direction.

A fourth aspect of the invention relates to an integrated circuit comprising,
1) a number of circuits,
2) a clock generating or receiving node,
3) a number of relay nodes, each circuit being connected to a node, each relay node being adapted to receive a signal from one or more nodes and transmit a signal to at least one other relay node and/or a circuit connected thereto,
4) interconnecting elements interconnecting the nodes so that a signal from the receiving/generating node causes a signal transmitted to all relay nodes and all circuits,
wherein at least one of the relay nodes is interconnected with at least two relay nodes and adapted to not forward a signal to any other relay nodes and/or a circuit connected thereto, until a signal has been received from each of the at least two relay nodes.

As indicated above, a node may be incorporated in the circuit of a circuit fed with timing signals from the node. Alternatively, the nodes may be completely separated from the circuits, such as if the nodes were provided by a subcontractor as separate IP.

Preferably, step 3) comprises providing a plurality of the nodes adapted to receive a timing signal from two or more nodes and to not transmit the corresponding timing signal to the at least one other node, before a timing signal has been received from each of the two or more nodes.

Also, it is advantageous wherein step 3) comprises providing one or more of the nodes to be adapted to, when receiving a first timing signal from one or more other nodes, transmit an acknowledging signal to each of the one or more other node(s).

Then, the one or more nodes could further be adapted to not transmit a subsequent timing signal received from the other node(s), before having received an acknowledging signal from each of the node(s) to which a timing signal corresponding to the first timing signal has been transmitted.

Additionally or alternatively, the one or more nodes could be adapted to not transmit the acknowledging signal(s) before having received timing signals from all nodes transmitting timing signals to the node.

Transmission of e.g. data between the circuits is desired and may be made easier when at least one of the nodes is adapted to receive a timing signal being a sequence, in time, of at least two different values, and to transmit, to the other node(s), as the corresponding timing signal, the received timing signal inversed so that high and low values are interchanged in the same timing sequence.

Preferably, two of the circuits comprise means for interchanging data, the interchanging means being controllable by the timing signals received by the circuits from each of two of the nodes.

Then, preferably, the interchanging means each are adapted to transmit or receive data in connection with a change, in the timing signal received, from a lower of the two or more values to a higher of the values or a change from the higher to the lower of the values.

In one embodiment, the two circuits are adapted to transmit or receive data in connection with the same change (lower to higher or higher to lower) and are connected to two neighbouring nodes or two nodes between which an even number of the at least one node(s) exist.

The topology may be controlled when the nodes are physically positioned over the predetermined area, defined by two non-parallel directions, so that the node(s) adapted to receive a timing signal from a transmitting node are positioned further in at least one of the directions than the transmitting node.

Noise generation in the circuits may be reduced or prevented when the circuits are positioned on or over a surface, so that at least a predetermined distance exists between neighbouring circuits, and wherein the interconnecting means are primarily positioned between the circuits (such as when translated onto a plane of the surface).

A simple topology is one wherein the nodes are positioned at least substantially in positions corresponding to an intersection of one line of a plurality of at least substantially equidistantly positioned lines along a first direction and one line of a plurality of at least substantially equidistantly positioned lines along a second direction being non-parallel to the first direction.

A fifth aspect of the invention is a node for use in the above methods or in the above apparatus/circuit, the node being adapted to:

receive a timing signal from at least two timing signal sources and output a timing signal only when having received a timing signal from both signal sources.

Preferably, the node is further adapted to output the timing signal to a circuit connected to the node.

Also, the node may further be adapted to output an acknowledging signal to a timing signal source when having received a timing signal there from. In this situation, the node may be adapted to only output an acknowledging signal when having received a timing signal from each timing signal source. Additionally or alternatively, the node may be adapted to be connected to one or more nodes and be adapted to transmit the timing signal to the one or more nodes, the node being adapted to, when having output a first timing signal to the one or more nodes, not forward a subsequent timing signal to the one or more nodes, before having received an acknowledging signal relating to the first timing signal from the one or more nodes.

Finally, the node may be adapted to receive a timing signal being a sequence, in time, of at least two different values, and to transmit, as the output timing signal, the received timing signal inversed so that higher and lower values are interchanged in the same timing sequence.

Naturally, the node may be a physical entity, such as a circuit. However, the node may just as well be defined as a software program useful on a programmable processor or as a net list adapted for use in generating an integrated circuit.

BRIEF DESCRIPTION OF THE DRAWINGS

In the following, a preferred embodiment will be described with reference to the drawing, wherein.

DETAILED DESCRIPTION OF EXAMPLE EMBODIMENTS

In the following, we introduce a new mesochronous clocking scheme called Para-Phase Clocking (PPC) which avoids meta stability issues all together, while maintaining the freedom of communicating globally in all directions between any neighbouring PPC nodes or regions. This is done by placing simple geographical constraints on the clock distribution. The advantages of PPC are arbitrarily timing safe operation and a graceful performance degradation. This means that the timing of global communication can be made arbitrarily robust by lowering the clock frequency, and at a finite clock frequency reduction, data transfer timing across the borders of PPC regions is guaranteed to be 100% safe. Global hold-time violations, which may render a chip non-functional, are controlled and contained in an elegant manner, thus providing utterly timing-safe global communication. Additionally, the PPC concept has a low overhead implementation.

Figure 1:
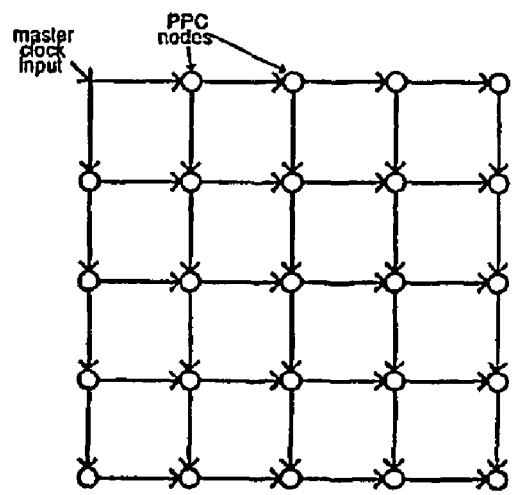
FIG. 1 illustrates a homogeneous PPC (para-phase or non-para-phased clocked) clock distribution grid.

In the following, a quick description is given of the fundamental aspects of PPC (paraphrase clocking) and its 'non-para-phased' counter part SDC (skew directed clocking). The term PPC is used to refer to both paraphased and non-paraphased versions (i.e. using inverting and non-inverting nodes). A PPC chip is partitioned into a 2 dimensional grid as shown—in a homogeneous case—in FIG. 1. The master clock is applied in the top left corner, and travels along the edges of the grid, as illustrated by arrows in the figure. At grid points, the two incoming clock pulses are merged by synchronizing the edges of these. Thus, in the non-inverting version the front edge of the outgoing clock is generated when the front end of both incoming clock pulses have arrived, likewise the back edge of the outgoing clock is generated when the back edge of both incoming clock pulses have arrived. The result of this functionality is that any node to the right or below another node will always have a clock which is later than the clock of this other node. Of course, in order for a clock event not to be lost anywhere in the grid, the edges of both incoming clocks at a grid node must arrive before the next edge of either of the two. This requirement limits the maximum attainable clock frequency in the system. However if the delays on grid edges are matched reasonably well, this shouldn't be a major problem. In any case, such delay matching is far easier than matching the delay of branches in a globally spanning clock tree. Also, a delay mismatch doesn't result in system failure, as it might in a clock tree, due to hold-time violations, rather it merely reduces the maximum clock frequency of the system. Further below, we shall look at an expansion which makes the method safe with regards to unmatched delays along the grid edges, at the cost of performance.

Figure 2:
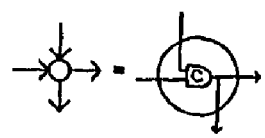
FIG. 2 illustrates a clock generating node which synchronizes the edges of two incoming clock pulses.

The function of the nodes can be implemented by a C-element, which is a two-input logic element on which the output goes high only when both inputs are high, and low only when both inputs are low. The two out-going arrows of most nodes in the figure are simply copies of this locally generated clock pulse. The implementation of such a PPC node is shown in FIG. 2. PPC nodes along the edges of the grid have only one input or one output. The function of the single-input nodes simply involve a buffering of the incoming clock pulse. It is desirable, though not required, to match the delay of these buffers with that of the C-element in the dual-input nodes within the grid, in order to get an even delay distribution within the grid, as this leads to higher performance potential.

The system described above enables a system-wide clock which has a directed skew in both of the chip's two dimensions. Thus data can easily be transmitted upstream, along both dimensions, as hold time violations are avoided due to the directed skew of the clock. Downstream, data transmissions can ride the clock pulse, as is the case of data transmission in asynchronous bundled data flow control protocols, in which the data rides along with a request signal indicating data validity. This however introduces some timing issues, and may lead to timing-unsafe transmissions since the data and the clock delay must be matched so that the data delay is larger or lower than the clock delay, by a period no less than the time required to ensure that hold and setup time violations are avoided when receiving the data.

Figure 3:
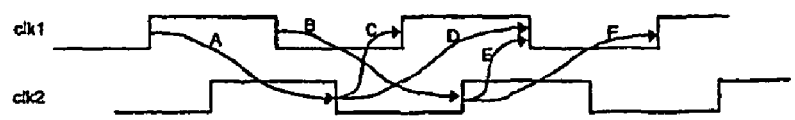
FIG. 3 illustrates waveforms showing timing-safe transmissions of data from one PPC region to another.
Figure 3:
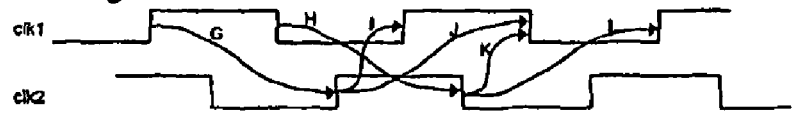

FIG. 3 shows the timing-safe transmission arcs possible from one PPC node to another in the case of a non-inverting node and an inverting node. It is seen that these transmissions can be made completely timing-safe by lowering the clock frequency, as the hold time as well as the setup time at the receiving end are dependent on the clock frequency. Assuming that an effort is made to keep a 50% clock duty cycle, lowering the clock frequency automatically results both in improved setup time and improved hold time.

The clocks named clk2 are downstream from the clocks named clk1. The timing-safe data transmission arcs in the non-inverting case are:
Downstream:
  A: positive edge to negative edge.
  B: negative edge to positive edge.
Upstream:
  C: negative edge to positive edge.
  D: negative edge to negative edge.
  E: positive edge to negative edge.
  F: positive edge to positive edge.

In the inverting case, the clock signal is inverted at each node such that neighbouring nodes are clocked at alternating clock phases. The timing-safe transmission arcs then become:
Downstream:
  G: positive edge to positive edge.
  H: negative edge to negative edge.
Upstream:
  I: positive edge to positive edge.
  J: positive edge to negative edge.
  K: negative edge to negative edge.
  L: negative edge to positive edge.

Implementing inversion of the clock at each node, the PPC nodes are now inverting C-elements, while the PPC nodes along the edges of the grid are simply inverters. This inversion is the essence of the para in the name para-phase clocking, since all neighbouring nodes will be clocked on alternate clock events. A positive clock edge in one node corresponds to the negative edge in its neighbours (the non-inverting case could more correctly be called skew directed clocking, SDC, but in this work we generally call it non-inverting PPC).

Inverting nodes make for a balanced system, where the duty cycle of the clock does not get distorted because of differences in the delay of positive and negative edges in the nodes. All clock events will make their way through the system alternating as positive edges and negative edges. Notice also that for inverting nodes, positive to positive edge transmissions are timing-safe both upstream and downstream (arcs G and I). These two characteristics make the system with inverting nodes very robust and easy to use. For improved performance on the other hand, one might also choose to transmit only on arcs A, B, D, F, G, H, J and L, which are longer.

The locally generated clock needs to be distributed isochronously within the PPC region. It is desirable to match the clock insertion delay of the regions, in order to obtain the best performance of the system. An alternative embodiment involves a mix of a PPC-grid and a hierarchy. A PPC grid is implemented, with small communication nodes—network on-chip routers—at each grid point. Since these nodes are small, it is less problematic to match the insertion delay of the local clock distribution network in these, since it will in any case be quite small. Each of these nodes can communicate directly with its PPC node neighbours. In addition each node can communicate with its local region. The local clock is distributed in this region, and inverted. Thus the same timing considerations as described above for transmitting data across borders of PPC regions apply, and it is possible to obtain 100% timing-safety by lowering the clock to an acceptable level. For timing considerations, the clock insertion delay of the local clock distribution corresponds to the clock forwarding delay along the PPC grid lines.

Figure 4:
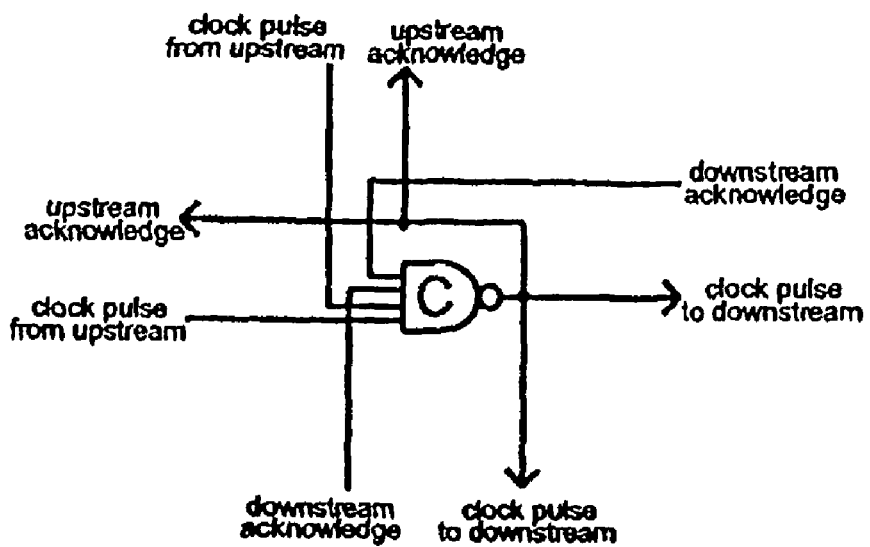
FIG. 4 illustrates an expanded PPC node, which generates an acknowledge signal for upstream PPC nodes and waits for acknowledgement from downstream nodes (inverting case)

An expansion which improves the reliability of the clocking, when there are large uncertainties of clock pulse propagation delays. Involves the distribution of a clock as described above, and the acknowledgement of this clock, in the reverse direction. The generation of a clock pulse edge thus requires both the arrival of clock pulse edges from upstream grid points and also the arrival of acknowledge pulse edges from downstream nodes, acknowledging that the clock edge has arrived safely, and resulted in a clock pulse edge at this upstream grid point. This reduces the maximum clock frequency obtainable, but improves the robustness of the system making the performance less dependent on balanced local clock propagation delays. FIG. 4 shows how a grid point can be implemented in a 2 dimensional grid employing acknowledged clock pulses, by a 4-input C-element. The figure shows the case of an inverting node. The method may also be used in the non-inverting case. In this case, Inverters preferably are inserted in the acknowledge paths. Naturally, the initial master clock preferably also adheres to this acknowledge, not generating a clock edge unless the acknowledge edges have been detected.

An alternative acknowledged PPC node can be implemented using a decoupled acknowledge. In such a node, an acknowledge is transmitted to each input, independently of the other inputs. This way, each node from which an input signal is received, can initiate its return-to-zero phase more quickly. The node will then remember that it has received signals on its inputs, and generate an output signal once all inputs have been activated. A node connected to an input which has been acknowledged may naturally generate yet another clock event signal. This signal will however not be acknowledged until an output signal has been generated in the node, based on the earlier input signal, the signal which was acknowledged before the node had received signals on all its inputs.

Figure 5:
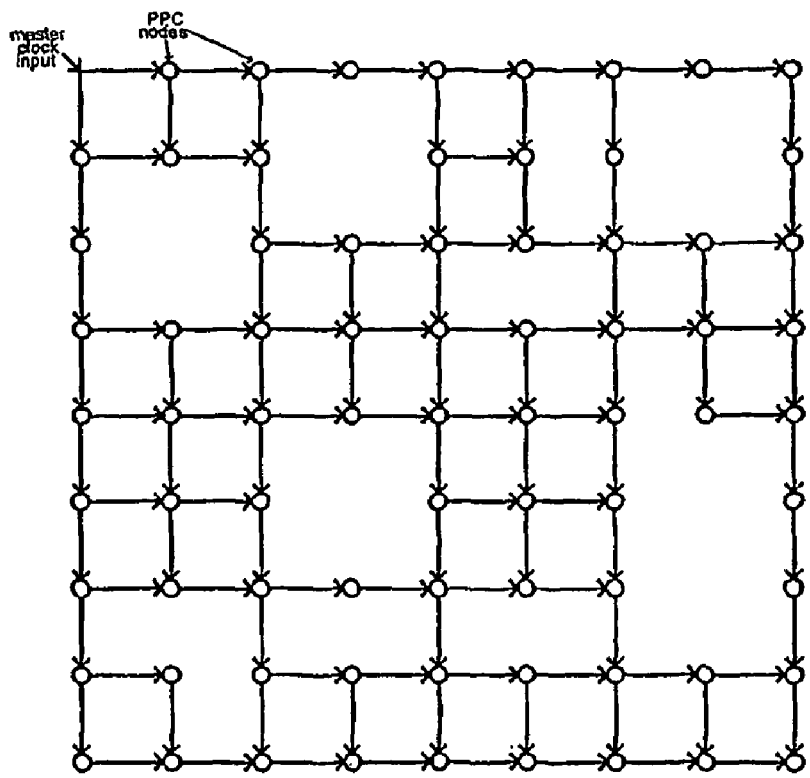
FIG. 5 illustrates a heterogeneous PPC clock distribution grid.

Another expansion relates to the implementation of heterogeneous systems. A PPC chip can be partitioned into small regions, and then grid lines can be systematically removed, creating the desired heterogeneous layout of regions. This results in a number of PPC nodes with only one output, only one input, or both. FIG. 5 shows an example of such a heterogeneous system. This does not affect the fundamental function of the PPC grid. Similarly to the PPC nodes along the edges of the grid, a PPC node within the grid, which has only one input, is simply an inverter. Such a device functions as a buffering element, which is often required in any case, when distributing electrical signals across a chip. A PPC node with only one output is trivial, as the two outputs of a PPC node are simply copies of the same, locally generated clock signal. Also here, it is desirable—but not required—to match the delay of a simple inverting (single-input PPC node) with that of dual-input PPC nodes in the system, in order to obtain maximum performance of the clock distribution system as a whole.

A heterogeneous PPC system is slightly more complicated than the homogeneous PPC system. Each region is clocked by only one PPC node. The transmission conditions established above for a homogeneous PPC system account for the transmission of data between two neighbouring PPC clock regions, neighbouring in the sense that they are clocked by neighbouring PPC nodes in the grid. Thus in a heterogeneous PPC system as described in the previous paragraph, timing safety of data transmission is guaranteed according to the "rules" of the homogeneous system only between a given— larger than one grid region—PPC region, and the regions clocked by PPC nodes neighbouring the PPC node that the region itself is clocked by. In the hierarchical PPC system described a while back, this is not a problem, since the network always transmits data between regions and the PPC node by which it is clocked, or between neighbouring PPC nodes, which are expanded into NoC routers.

Naturally, there are some restrictions with regards to the shape of the regions. If all regions are geometrically convex there are no problems. Concavities purely in the downstream directions are not allowed, as this would result in nodes with no inputs. Concavities in one upstream and one downstream direction are not a problem. Neither are concavities purely in upstream directions.

Large grids may limit the performance (maximally obtainable clock frequency) due to uneven delay distribution in the grid. However small grid regions on the other hand make geographically dependent delay variations smaller, thus counter acting the negative effects. Also. In a large grid, randomly dependent delay variations will cancel each other out, as seen across many grid hops.

The PPC and SDC methods of mesochronously clocking of large systems and taking advantage of a directed skew, as described above for its two dimensional case, may with little effort be expanded to 3 or more dimensions. Thus it can also be used in larger non-planar systems, e.g. off-chip systems such as multicomputer networks and parallel computers.

The invention claimed is:

1. A method of providing timing signals to a number of circuits, the method comprising:
   providing a plurality of interconnected nodes, each circuit being connected to a node, each node receiving a timing signal from one or more other nodes and transmitting a corresponding timing signal to at least one other node and/or a circuit(s) connected to the node,
   providing the timing signal to one of the nodes,
   at least one node receiving the timing signal from each of two or more nodes and not transmitting the corresponding timing signal to the at least one other node and/or a circuit(s) connected thereto, before the timing signal has been received from each of the two or more nodes, and
   positioning the nodes topologically in a number of dimensions defined by at least two non-parallel directions so that the node(s) adapted to receive the timing signal from a transmitting node are positioned further in at least one of the at least two non-parallel directions than the transmitting node, such that a timing skew is along the at least two non-parallel directions.

2. A method according to claim 1, wherein a plurality of the nodes receive the timing signal from two or more nodes and do not transmit the corresponding timing signal to the at least one other node, before the timing signal has been received from each of the two or more nodes.

3. A method according to claim 1, wherein one or more of the nodes, when receiving a first timing signal from one or more other nodes, transmit(s) an acknowledging signal to each of the one or more other node(s).

4. A method according to claim 3, wherein the one or more nodes further do not transmit a subsequent timing signal received from the other node(s), before having received an acknowledging signal from each of the node(s) to which a timing signal corresponding to the first timing signal has been transmitted.

5. A method according to claim 3, wherein the one or more nodes do not transmit the acknowledging signal(s) before having received timing signals from all nodes transmitting timing signals to the node.

6. A method according to claim 1, wherein the timing signal received by the at least one of the nodes is being a sequence, in time, of at least two different values, and transmits, to the other node(s), as the corresponding timing signal, the received timing signal inversed so that higher and lower values are interchanged in the same timing sequence.

7. A method according to claim 1, further comprising the step of two of the circuits interchanging data, the interchanging of data being controlled by the timing signals received by the circuits from each of two of the nodes.

8. A method according to claim 6, wherein the interchanging data includes each circuit transmitting or receiving data in connection with a change, in the timing signal received, from a lower of the two or more values to a higher of the values or a change from the higher to the lower of the values.

9. A method according to claim 8, wherein the two circuits are adapted to transmit or receive data in connection with the same change and are connected to two neighbouring nodes or two nodes between which an even number of the at least one node(s) exist.

10. A method according to claim 1, wherein the positioning step comprises positioning the nodes physically over the predetermined area.

11. A method according to claim 1, wherein the nodes are provided at least substantially in positions corresponding to an intersection of one line of a plurality of at least substantially equidistantly positioned lines along a first direction and one line of a plurality of at least substantially equidistantly positioned lines along a second direction being non-parallel to the first direction.

12. A method of preparing an integrated circuit, the method comprising:
   providing a number of circuits,
   providing a clock generating or receiving node,
   providing a number of relay nodes, each circuit being connected to one of the relay nodes, each relay node being adapted to receive a signal from one or more relay nodes and transmit a corresponding signal to at least one other relay node and/or a circuit connected thereto, and interconnecting the receiving/generating node and the relay nodes so that a signal from the receiving/generating node will cause a clock signal transmitted to all relay nodes and all circuits, wherein:

providing the number of relay nodes includes providing at least one of the relay nodes as a first node adapted to receive a signal from at least two relay nodes and to not forward a signal to any other relay nodes and/or a circuit connected thereto, until a signal has been received from each of the at least two relay nodes, providing the number of relay nodes includes positioning the nodes topologically in a number of dimensions, defined by two non-parallel directions, so that the node(s) adapted to receive the timing signal from a transmitting node are positioned further in at least one of the two non-parallel directions than the transmitting node and so that a timing skew is along the two non-parallel directions, and interconnecting the receiving/generating node and the relay nodes include interconnecting the at least one relay node so as to receive signals from the at least two relay nodes.

13. A method according to claim 12, wherein providing the number of relay nodes includes providing a plurality of the nodes adapted to receive the timing signal from two or more nodes and to not transmit the corresponding timing signal to the at least one other node, before the timing signal has been received from each of the two or more nodes.

14. A method according to claim 12, wherein providing the number of relay nodes includes providing one or more of the nodes adapted to, when receiving a first timing signal from one or more other nodes, transmits) an acknowledging signal to each of the one or more other node(s).

15. A method according to claim 14, wherein the one or more nodes are further adapted to not transmit the subsequent timing signal received from the other node(s), before having received the acknowledging signal from each of the node(s) to which the timing signal corresponding to the first timing signal has been transmitted.

16. A method according to claim 14, wherein providing the number of relay nodes includes providing the one or more nodes adapted to not transmit the acknowledging signal(s) before having received timing signals from all nodes transmitting timing signals to the node.

17. A method according to claim 12, wherein providing the number of relay nodes includes providing at least one of the nodes receiving the timing signal being a sequence, in time, of at least two different values, and transmits, to the other node(s), as the corresponding timing signal, the received timing signal inversed so that high and low values are interchanged in the same timing sequence.

18. A method according to claim 12, further comprising providing two of the circuits with means for interchanging data, the interchanging means controllable by the timing signals received by the circuits from each of two of the nodes.

19. A method according to claim 17, wherein the interchanging means each being adapted to transmit or receive data in connection with a change, in the timing signal received, from a lower of the two or more values to a higher of the values or a change from the higher to the lower of the values.

20. A method according to claim 19, wherein the two circuits are adapted to transmit or receive data in connection with the same change and are connected to two neighbouring nodes or two nodes between which an even number of the at least one node(s) exist.

21. A method according to claim 12, wherein providing the number of relay nodes includes positioning the nodes physically in the dimensions, so that the node(s) adapted to receive a timing signal from a transmitting node are positioned further in at least one of the directions than the transmitting node.

22. A method according to claim 12, wherein providing the number of circuits includes providing the circuits on the surface, so that at least a predetermined distance exists between neighbouring circuits, and wherein interconnecting the receiving/generating node and the relay nodes includes interconnecting the nodes with electrical connections primarily positioned between the circuits.

23. A method according to claim 12, wherein providing the number of relay nodes includes positioning the nodes at least substantially in positions corresponding to an intersection of one line of a plurality of at least substantially equidistantly positioned lines along a first direction and one line of a plurality of at least substantially equidistantly positioned lines along a second direction being non-parallel to the first direction.

24. An apparatus for providing timing signals to a number of circuits, the apparatus comprising:

a plurality of interconnected nodes, each circuit being connected to a node, each node being adapted to receive a timing signal from one or more other nodes and to transmit a corresponding timing signal to at least one other node and/or a circuit(s) connected to the node, the nodes being topologically positioned in a number of dimensions defined by at least two non-parallel directions, the node(s) adapted to receive the timing signal from a transmitting node being positioned further in at least one of the at least two non-parallel directions than the transmitting node so that a timing skew is along the at least two non-parallel directions, a circuit for providing the timing signal to one of the nodes, and at least one node being adapted to receive the timing signal from each of two or more nodes and to not transmit the corresponding timing signal to the at least one other node and/or a circuit(s) connected thereto, before the timing signal has been received from each of the two or more nodes.

25. An apparatus according to claim 24, wherein each of a plurality of the nodes is adapted to receive the timing signal from two or more nodes and to not transmit the corresponding timing signal to the at least one other node and/or a circuit, before the timing signal has been received from each of the two or more nodes.

26. An apparatus according to claim 24, wherein one or more of the nodes are adapted to, when receiving the first timing signal from one or more other nodes, transmit an acknowledging signal to each of the one or more other node(s).

27. An apparatus according to claim 26, wherein the one or more nodes are further adapted to not transmit a subsequent timing signal received from the other node(s), before having received an acknowledging signal from each of the node(s) to which the timing signal corresponding to the first timing signal has been transmitted.

28. An apparatus according to claim 26, wherein the one or more nodes are adapted to not transmit the acknowledging signal(s) before having received timing signals from all nodes transmitting timing signals to the node.

29. An apparatus according to claim 24, wherein at least one of the nodes is adapted to receive the timing signal as a sequence, in time, of at least two different values, and to transmit, to the other node(s), as the corresponding timing signal, the received timing signal inversed so that higher and lower values are interchanged in the same timing sequence.

30. An apparatus according to claim 24, wherein two of the circuits comprise elements for interchanging data, the interchanging elements being controllable by the timing signals received by the circuits from each of two of the nodes.

31. An apparatus according to claim 29, wherein the interchanging elements are adapted to each transmit or receive data in connection with a change, in the timing signal received, from a lower of the at least two values to a higher of the values or a change from the higher to the lower of the values.

32. An apparatus according to claim 31, wherein the two circuits are adapted to transmit or receive data in connection with the same change and are connected to two neighbouring nodes or two nodes between which an even number of the at least one node(s) exist.

33. An apparatus according to claim 24, wherein the nodes are physically positioned over a set area defined by at least two non-parallel directions, the node(s) adapted to receive the timing signal from a transmitting node being positioned further in at least one of the at least two non-parallel directions than the transmitting node.

34. An apparatus according to claim 24, wherein the nodes are provided at least substantially in positions corresponding to an intersection of one line of a plurality of at least substantially equidistantly positioned lines along a first direction and one line of a plurality of at least substantially equidistantly positioned lines along a second direction being non-parallel to the first direction.

35. An integrated circuit comprising:
a number of circuits,
a clock generating or receiving node,
a number of relay nodes, each circuit being connected to the generating/receiving node and/or a relay node, each relay node being adapted to receive a signal from one or more of the generating/receiving node and the relay nodes and transmit a corresponding signal to at least one other relay node and/or a circuit connected thereto, the generating/receiving node and the relay nodes being topologically positioned in a number of dimensions, defined by two non-parallel directions, so that the relay node(s) adapted to receive the timing signal from a transmitting node are positioned further in at least one of the two non-parallel directions than the transmitting node so that a timing skew is along the two non-parallel directions, and
interconnecting elements interconnecting the relay nodes so that a clock signal from the receiving/generating node causes a signal transmitted to all relay nodes and all circuits,
wherein at least one of the relay nodes is interconnected with at least two relay nodes and adapted to not forward the corresponding signal to any other relay nodes and/or a circuit connected thereto, until a signal has been received from each of the at least two relay nodes.

36. A circuit according to claim 35, wherein the number of relay nodes includes providing a plurality of the nodes adapted to receive the timing signal from two or more nodes and to not transmit the corresponding timing signal to the at least one other node, before the timing signal has been received from each of the two or more nodes.

37. A circuit according to claim 35, wherein the number of relay nodes includes providing one or more of the nodes to be adapted to, when receiving a first timing signal from one or more other nodes, transmit an acknowledging signal to each of the one or more other node(s).

38. A circuit according to claim 37, wherein the one or more nodes are further adapted to not transmit a subsequent timing signal received from the other node(s), before having received an acknowledging signal from each of the node(s) to which the timing signal corresponding to the first timing signal has been transmitted.

39. A circuit according to claim 37, wherein the one or more nodes are adapted to not transmit the acknowledging signal(s) before having received timing signals from all nodes transmitting timing signals to the node.

40. A circuit according to claim 35, wherein at least one of the nodes is adapted to receive the timing signal as a sequence, in time, of at least two different values, and to transmit, to the other node(s), as the corresponding timing signal, the received timing signal inversed so that higher and lower values are interchanged in the same timing sequence.

41. A circuit according to claim 35, wherein two of the circuits comprise elements for interchanging data, the interchanging elements being controllable by the timing signals received by the circuits from each of two of the nodes.

42. A circuit according to claim 40, wherein the interchanging elements each are adapted to transmit or receive data in connection with a change, in the timing signal received, from a lower of the at least two values to a higher of the values or a change from the higher to the lower of the values.

43. A circuit according to claim 42, wherein the two circuits are adapted to transmit or receive data in connection with the same change and are connected to two neighbouring nodes or two nodes between which an even number of the at least one node(s) exist.

44. A circuit according to claim 35, wherein the nodes are physically positioned over the set area, so that the node(s) adapted to receive the timing signal from a transmitting node are positioned further in at least one of the directions than the transmitting node.

45. A circuit according to claim 35, wherein the circuits are positioned on the surface, so that at least a set distance exists between neighbouring circuits, and wherein the interconnecting elements are primarily positioned between the circuits.

46. A circuit according to claim 35, wherein the nodes are positioned at least substantially in positions corresponding to an intersection of one line of a plurality of at least substantially equidistantly positioned lines along a first direction and one line of a plurality of at least substantially equidistantly positioned lines along a second direction being non-parallel to the first direction.

* * * * *